United States Patent [19]

Brandt

[11] Patent Number: 5,710,189
[45] Date of Patent: Jan. 20, 1998

[54] BLOWING AGENT COMPOSITION AND A METHOD FOR MAKING A BLOWING AGENT

[76] Inventor: M. Karl Brandt, 680 Wise Ferry Rd., Lexington, S.C. 29072

[21] Appl. No.: 769,458

[22] Filed: Dec. 18, 1996

Related U.S. Application Data

[63] Continuation-in-part of Ser. No. 488,746, Jun. 8, 1995.
[51] Int. Cl.$^6$ ................................................. C08J 9/00
[52] U.S. Cl. ........................... 521/91; 252/350; 521/76; 521/122; 521/79; 523/219
[58] Field of Search ....................... 521/91, 76, 122, 521/79

[56] References Cited

U.S. PATENT DOCUMENTS

| | | |
|---|---|---|
| 4,167,611 | 9/1979 | Czarnecki et al. ............... 521/122 |
| 4,518,718 | 5/1985 | Frost ............................. 521/122 |
| 5,177,117 | 1/1993 | Coe et al. ....................... 521/129 |
| 5,401,785 | 3/1995 | Kumagai et al. ................. 521/133 |

*Primary Examiner*—Morton Foelak

[57] ABSTRACT

The present invention relates to a composition for use as a blowing agent in injection molding processes. More specifically, the present invention is a blowing agent composition comprising a molecular sieve and a foaming agent, wherein the foaming agent is carded by the molecular sieve and evolves to form foamed plastic products. In addition, the present invention is a method for preparing a blowing agent composition and a foamable blowing agent-resin mixture. Furthermore, the present invention is a foamed plastic resin containing a molecular sieve. Additionally, the present invention provides a composition and method for foaming moisture-sensitive polymers comprising the addition of molecular sieves and a poly-hydroxy ester. The present invention also advances a method of encapsulating a blowing agent on a polymer substrate and a corresponding encapsulated blowing agent composition.

8 Claims, No Drawings

BLOWING AGENT COMPOSITION AND A METHOD FOR MAKING A BLOWING AGENT

This application is a continuation-in-part of application Ser. No. 08/488,746, filed Jun. 8, 1995.

BACKGROUND OF THE INVENTION

1. Field of the Invention

The present invention relates to injection molding of foamed plastic products. In particular, the present invention relates to blowing agents used in injection molding and extrusion.

2. Discussion of Background

The use of blowing agents in the foaming of plastic and rubber objects is well known. Blowing agents are chemicals added to plastics and rubber that generate gases at preselected temperatures and pressures, causing expandable materials such as resins to develop a cellular or foam-like physical structure.

Currently, foaming processes are accomplished using solid compounds that can be decomposed to generate a gas, liquids that vaporize upon heating, and gases. Foaming agents can additionally be classified into exothermic foaming agents (i.e., azo compounds, borohydride, to produce $H_2$ and $N_2$ gases), endothermic foaming agents (i.e., citric acid, sodium bicarbonate, to produce $CO_2$ gas), and combinations of endothermic and exothermic blowing agents. Examples of using blowing agents to produce foamed compositions can be found in Chang, U.S. Pat. No. 4,097,421; Gebauer, et al., U.S. Pat. No. 4,278,769; and White, et al., U.S. Pat. No. 4,737,523.

Until the present time, the satisfactory foaming of products has been difficult due to endothermic and exothermic blowing agents lacking chemical and physical stability at high temperatures. In addition to being unstable at high temperatures, endothermic and exothermic blowing agent concentrates combined with waxy or other types of careers are often incompatible with desired resins. As a result, non-uniform, inconsistent foamed products are often produced.

For example, when endothermic blowing agents are used with high melting point thermoplastic resins, the temperatures in the extruder exceed the reaction temperature of endothermic blowing agents, causing premature foaming. Careers, such as waxy compositions, have been employed to help alleviate this problem; however, the melting temperature differentials between the waxy material, the blowing agent and high melting thermoplastic resins are such that uniform mixing of the constituents is difficult.

Furthermore, endothermic blowing agents are difficult to control in many standard processes. For example, many endothermic blowing agents evolve a foaming material at a temperature significantly higher than the melting temperature of many thermoplastic resins. Consequently, at the evolution temperature, the thermoplastic resin lacks the requisite strength to enable the bubbles to be maintained within its structure. As a result, foamed resins using endothermic blowing agents produce poor quality products having inferior bubble characteristics.

In addition, moisture sensitive polymers and resins, such as nylon, polycarbonates, acetals, poly-formaldehydes, and polyesters, including polyethylene terephthalate, were heretofore difficult if not impossible to foam. In fact, polymers such as polycarbonate are degraded by blowing agents currently used in foaming processes, causing them to lose their strength and durability within short periods of time. The degradation of these moisture-sensitive polymers is the result of water within the batch which cleaves the polymer chain and prevents the polymer from obtaining the necessary strength.

Despite current efforts, there is a need to provide a simple, convenient method for adjusting the rheology of a blowing agent-resin mixture; to alleviate the expense and inflexibility of a gas injection means; and to provide an improved cellular structure for the foamed product.

The foaming of resins by extrusion and molding methods is well known in the prior art and may be accomplished by a variety of techniques. Generally, blowing agents are injected into a molten resin in the extrusion process, blended, and extruded through a die to a low-pressure zone to produce a foam. Due to difficulties in blending gas foaming materials into molten resins, the foamed product often contains non-uniform foaming characteristics, such as bubbles concentrated in certain areas of the product, large bubbles and non-uniform bubble dimensions. Furthermore, the injection system necessary for introducing certain gas foaming materials into the resin results in a system that economically inhibits the addition of more than one type of blowing agent into the resin. Therefore, it is virtually impossible to optimize the characteristics of the foamed product.

Various attempts have been made to improve the level of foaming uniformity, such as the addition of waxy carriers and the surface treatment of the blowing agents with various chemicals such as mono-glycerides, stearic acid, silane coupling agents, fatty acid titanates and mixtures of these. However, there is currently a need to provide an economical means to introduce blowing agents into a resin. In addition, there exists a need to improve bubble forming characteristics and, thus, improve the foamed product.

Garcia, et al., in U.S. Pat. No. 5,234,963, teach a process and apparatus for compounding and pelletizing chemical foaming or blowing agents in a high melt resin carder to produce pelletized chemical foaming concentrates that can be used in thermoplastic resins. Although Garcia, et al. disclose an encapsulated foaming gas more compatible with thermoplastic resins, Garcia, et al. do not disclose the use of a molecular sieve to carry and regulate foaming gases in foaming processes.

Molecular sieves are microporous structures composed of either crystalline aluminosilicates, chemically similar to clays and belonging to a class of materials known as zeolites, or crystalline aluminophosphates. A useful characteristic of molecular sieves is their ability to undergo dehydration with little or no change in crystalline structure, producing "activated" molecular sieves. Dehydration of the molecular sieves can be performed by any method in which water can be removed from the pores of the crystalline structure, resulting in empty cavities. Dehydrated molecular sieves are referred to as activated molecular sieves because once the water is removed from the sieve pores, the sieves have a strong tendency to fill the cavity once again with water. The desire of the sieve to recapture the water is so strong that the sieve will accept any material that is capable of entering the cavity. If more than one material is present that is capable of entering the cavity, the sieve will select which one occupies the cavity based on chemical characteristics such as electrostatic attractions. Molecular sieves are used in many fields of technology: to dry gases and liquids, for selective molecular separations based on size and polar properties, as ion exchangers, as catalysts, as chemical carriers, in gas chromatography, and in the petroleum industry to remove hydrogen sulfide and normal paraffins from distillates. However, molecular sieves have not heretofore been used in the foaming of water sensitive resins.

Therefore, it is an object of the present invention to provide a means of introducing the foaming material into an extruder without the use of an injector, to provide an economical means of varying foaming gases introduced into the resin, and to provide a blowing agent that will produce a foamed structure having bubbles of uniform size and distribution.

SUMMARY OF THE INVENTION

According to its major aspects and broadly stated, the present invention is a blowing agent composition, a method for making a blowing agent, and a method for using a blowing agent. More specifically, the present invention is a blowing agent composition comprising molecular traps, such as molecular sieves, and a foaming material. The blowing agent is mixed with a resin and added directly to an extruding or injection molding device to form a foamed plastic product. The foaming material carried by the molecular trap will evolve from the molecular trap at a preselected temperature and pressure to form a foamed product.

The foaming material carried by the molecular trap will evolve from the molecular trap at a preselected temperature and pressure, such as those used in common injection molding and extrusion processes. The foaming material used can be any suitable material that will generate a gas when subjected to heating and pressure changes in a confined space. When the molecular trap is a molecular sieve, the foaming material is a gas, a solid or a liquid and is present in the molecular sieves in amounts up to approximately 26%, preferably 23% by weight, of the blowing agent composition. (The blowing agent composition used for these calculations includes the molecular trap and the foaming material. Therefore, if approximately 0.3 grams of the foaming material are used and approximately 1.0 grams of the molecular trap are used, for a total weight of 1.3 grams, the foaming material (0.3 g) comprises approximately 23% of the blowing agent composition (1.3 g).) More preferably, the foaming material is a gas or a liquid that will vaporize upon heating. The foaming material adsorbed is "trapped" by the molecular sieve crystal and remains trapped until the conditions, such as temperature and pressure, are altered. When the blowing agent composition is added to a material to be foamed (i.e., resins, plastics, rubber or other material susceptible to foaming), the gas is released by altering the temperature and pressure to those within a preselected range. Materials may be desorbed from molecular sieves in the form of a gas in a variety of ways. For example, materials may be desorbed by raising the temperature or lowering the pressure. When present in a resin material, the desorbing gas forms bubbles that cause the resin material to develop a foamed cellular structure. Accordingly, when the temperature is reduced the foamed composition solidifies, leaving bubbles of uniform distribution and size, and the foaming material is readsorbed by the sieve.

In an alternative embodiment, a molecular trap without the foaming material can be mixed with a suitable resin and introduced into an extruder or other suitable environment so that the molecular trap is blended into the resin. The resin/molecular trap product is preferably in the form of pellets. The resin/molecular trap pellets can then be exposed to a suitable foaming material, which will diffuse into the resin to the molecular traps to be adsorbed by the molecular traps. Once the molecular traps located in the resin have adsorbed the foaming material, it is equivalent to the blowing agent composition disclosed above and furthermore, behaves the same as the blowing agent composition above. Therefore, this is simply an alternative method of incorporating a blowing agent into a resin, allowing for increased flexibility in the storage of the blowing agent/resin mixture as well as the increased flexibility in the foaming process.

The blowing agent composition can be prepared using any suitable molecular traps, or combination of molecular traps, and any suitable additives. Molecular sieves are preferably used as the molecular trap; however, any suitable trapping molecule or substrates can be used. Molecular sieves are naturally occurring or synthetic zeolites characterized by their ability to undergo dehydration with very little or no change in crystal structure, thereby providing a high surface area for adsorption or trapping of other molecules. In addition, additives can be adsorbed by the molecular sieve or added to the molecular sieve-foaming material mixture (blowing agent) to give a final product specific physical qualities, such as special surface characteristics; to optimize the rheology of the resins; or to make the blowing agent easier to handle, less explosive and fire resistant.

In addition to molecular sieves, any suitable molecular trap can be used in the blowing agent composition. Suitable molecular traps include, but are not limited to, zeolites, cellulose compounds, silica gels, alumina gels, and carbon compounds, such as carbon cage compounds buckminsterfullerenes (bucky balls) and activated carbon.

The present invention is additionally directed to a method for preparing a composition for use as a blowing agent, which comprises exposing a molecular trap to a foaming material so that the foaming material is carried by the molecular trap in an amount sufficient to foam a resin. The appropriate foaming material can be added to the molecular trap by any suitable means in which the molecular traps are exposed to the foaming material so that the foaming material becomes "trapped" within the molecular traps. Trapped means to bind a molecule by adsorption, absorption, or electrostatic attraction.

Exposure of the foaming material can be performed by introducing the foaming material into a vessel, wherein the vessel contains the molecular traps. The method further comprises agitating, preferably by rotating the vessel, to maximize the exposure of the molecular traps to the foaming material, thus aiding the adsorption of the foaming material by the traps. Alternatively, the vessel containing the molecular traps can be fitted with a gas lance to introduce the foaming material in gaseous form into the vessel in a first direction and an auger to cause the molecular traps to move in a second direction opposite the direction of the gas flow. The opposite directional movement of the sieves in relation to the gas increases the exposure of the sieves to the gas, thus aiding the adsorption of the gas by the sieves.

The present invention is further a foamable mixture comprising a molecular sieve and a foaming material, wherein the foaming material is carried by the molecular sieve. In addition, the present invention is a method for preparing a foamed composition which comprises mixing a blowing agent and a resin to form a first mixture; changing the temperature and pressure of the first mixture to a preselected temperature and pressure so that the blowing agent evolves a gas into the resin, forming a foamed composition. Once foaming has occurred, the foamed composition is solidified. Furthermore, the present invention is a foamed composition prepared by this method and comprising a resin, a molecular sieve mixed with the resin, and a foaming material mixed with the resin and the molecular sieve.

The present invention is further a method and composition for encapsulating a blowing agent, i.e., a molecular trap containing a foaming material, on a resinous substrate. The present invention also includes a method for foaming a resin using the encapsulated blowing agent. The method of encapsulation comprises coating resin beads or pellets with a tacky resin diluted in a solvent solutiopentan solvent utilized may be butane, pentane, toluene or other known solvent. A quantity of molecular trap is then applied to the tacky resin/solvent solution. The solvent is absorbed by the pores in the molecular trap, which in turn forms a blowing agent and secures the molecular trap to the tacky resin. Thereafter, a sealing coat may be applied over the blowing agent.

The method for foaming a resin using the encapsulated blowing agent comprises maintaining separation between the resin to be foamed and the encapsulated blowing agent and introducing the encapsulated blowing agent immediately prior to the extruder entrance. Alternatively, the encapsulated blowing agent and resin may be mixed and subsequently transported to the extruder's entrance. The resin and encapsulated blowing agent is then extruded to form a foamed composition.

The present invention is further directed to a foamed moisture-sensitive resin composition and a method for making the same. The method comprises mixing the moisture-sensitive resin with a desiccant, preferably a 3A molecular trap, a second molecular trap having a pore size greater than 3A which is impregnated with a quantity of a foaming material, and a quantity of a poly-hydroxy ester. This mixture is pelletized in accordance with normal industry practice. The pelletized mixture is then extruded. During the extrusion process, the mixture reaches the correct temperature and pressure to cause the evolution of the foaming material from the molecular trap. The foamed moisture-sensitive resin composition is then solidified.

Alternatively, the mixture of a first molecular trap, second molecular trap and poly-hydroxy ester may be coated on a resinous substrate and covered by a sealing compound to form an encapsulated blowing agent compound. Thereafter, this compound is mixed with the moisture-sensitive resin and extruded. During the extrusion process, the mixture reaches the correct temperature and pressure to cause the evolution of the foaming material from the molecular trap. The foamed moisture-sensitive resin composition is then solidified.

A primary feature of the present invention is the use of molecular sieves as carrier/regulators that selectively "trap" specific foaming materials and desorb or release these foaming materials at certain temperature and pressure conditions to produce consistently foamed product. Molecular sieves physically trap molecules such as gases and/or volatile liquids, based on the properties of molecular size and electronic attraction.

An advantage of the molecular sieves is that they act as carrier-regulators for foaming materials. The blowing agent composition comprising the foaming material carried by the molecular sieves is mixed with a resin to form a material suitable to be added directly to an extruder. Because the blowing agent can be added directly to the extruder with the resin, the need for a gas injection system is eliminated, thereby simplifying manufacture and decreasing manufacturing costs.

Another advantage of the foaming material being contained in the molecular sieves is the ease with which the blowing agent composition may be handled. Due to this ease in handling, the foaming characteristics of the resin may be adjusted or tailored to form a foamed product with specific physical characteristics. Mixtures of blowing agents in differing proportions can be added to the resin mixture (the resin may be in solid or liquid form) to optimize the foaming characteristics and the rheology of the resin. Heretofore, the mixing of differing physical blowing agents to optimize foaming characteristics has been economically impractical, because of the necessity of a gas injection system for each physical foaming material added to the resin. A physical blowing agent is a material that is normally a gas at room temperature (such as nitrogen and carbon dioxide), or a low boiling liquid such as butane or pentane. In addition, the ability to adjust the blowing agent composition allows the rheology of the resin to be modified to meet the requirements of the extrusion process. This is important for many reasons, such as when subtle changes are experienced in the feed resin stock. Moreover, this flexibility results in less down time, a more consistent product and less wasted material.

In addition, a feature of the present invention is the use of the desorptive qualities of the molecular sieves to influence the physical characteristics of a resinous body. It is well known in other applications to use the adsorptive qualities of molecular sieves; however, the desorptive qualities of molecular sieves have heretofore not been used as an advantage in foaming processes, such as injection molding or extrusion processes. The use of both the adsorption and the desorption qualities of the molecular sieves in foaming processes allows for the regulation of foaming materials or additives trapped by the molecular sieves. For example, a foaming material will remain trapped within the molecular sieves until conditions, such as heating or low pressure, induce the release of the gas from the molecular sieves. Upon subsequent cooling the gas will be reabsorbed back into the molecular sieve structure.

An advantage of using molecular sieves to both transport and regulate the foaming gas is that the molecular sieve provides a natural nucleating site of uniform proportion, so that controllable, consistent bubbles are formed within the foamed product in a predictable controlled manner. To provide consistent foaming, prior to the present time it has been necessary to provide nucleating sites by the addition of substances such as talc within the resin.

In addition, an advantage of the present invention is that the blowing agent composition has no adverse effects on the final foamed product.

Still a further advantage of the present invention is that the blowing agent composition is easily mixed with the resin to form a uniform mixture and consequently a uniform product.

Still another feature of the present invention is the use of molecular traps and a poly-hydroxy ester to form a foamed moisture-sensitive resin composition. Heretofore, the foaming of moisture-sensitive resins has been impracticable due to the cleavage of chemical bonds within the resin by water, which in turn results in low melt strength and the lack of bubble uniformity. The use of molecular trap as a desiccant assures the absorption of water within the resinous system and prevents the cleavage of the chemical bonds within the resin. Using a blowing agent, that is, the second molecular trap impregnated with a foaming material, ensures uniform and consistent bubble characteristics, while the addition of a poly-hydroxy ester minimizes and heals breaks in the polymer chain of the resin, which in turn prevents the polymer from collapsing the bubbles subsequent to formation. This combination of molecular traps, blowing agent, foaming material and poly-hydroxy ester enables foamed moisture-sensitive resins to maintain the requisite strength and bubble characteristics necessary for a variety of industrial applications.

Another feature of the present invention contained in an alternative preferred embodiment is the tacky resin and solvent solution used in the encapsulation of a blowing agent on a resinous substrate. The use of a solvent provides a foaming material that is absorbed by the molecular trap to form a blowing agent. Additionally, the attraction of the molecular trap to the solvent assures that the molecular trap remains embedded within the tacky resin. Moreover, the tacky resin is selected to have a melting temperature approximately equal to the melting temperature of the resin to be foamed. In no instance should the tacky resin have a melting temperature greater than 100° F. below the melting temperature of the resin to be foamed. This assures an even melt within the extruder and prevents inconsistencies in the final product. In addition, when melted in the extruder, the tacky resin melts to form a non-lubricating fluid. Since the fluid is not a lubricant, it does not cause the excessive spinning of the extruder's auger, commonly referred to in the art as "slippage." Preventing "slippage" of the extruder assures the proper mixing of the resin to be foamed and the blowing agent, which in turn provides greater consistency of bubble size and concentration in the foamed product.

Other features and advantages of the present invention will be apparent to those skilled in the art from a careful reading of the Detailed Description of a Preferred Embodiment presented below.

DETAILED DESCRIPTION OF A PREFERRED EMBODIMENT

The present invention relates to a blowing agent that employs a molecular sieve carrier to regulate the foaming materials and to provide a nucleating site for the formation of improved foamed products. The adsorptive quality of molecular sieves has been explored in depth for separation, purification and catalytic techniques; however, the desorptive quality of molecular sieves has heretofore been overlooked. It is the purpose of the present invention to use molecular sieves as carriers, regulators and nucleating sites in the foaming of resinous materials.

According to the present invention, the blowing agent composition comprises a molecular sieve and a foaming material, wherein the foaming material is carried in the molecular sieve in an amount up to approximately 26%, and preferably between approximately 23% and 26%, and most preferably approximately 23% by weight of the blowing agent composition. (These percentages are based on the total weight of the blowing agent composition.) The molecular sieves used to adsorb the foaming material are preferably synthetically-produced crystalline metal alumino-silicates characterized by their ability to undergo dehydration with very little or no change in structure, thereby offering a very high surface area for the adsorption or trapping of molecules. Unlike other adsorbents, the pores of molecular sieves are precisely uniform in size and dimension. This precision of structure allows specific types of molecules to be readily adsorbed. The molecular sieve selectively excludes molecules larger than the sieve pores and, once in the pores, the molecules are trapped electrostatically. As a result of the electrostatic attraction, molecular sieves display a selective preference based on polarity or polarizable molecules. Selectivity on both molecular size and polarity provides molecular sieves with a high level of adsorptive efficiency, which has made molecular sieves especially useful in drying and purifying gases and liquids as well as other separation techniques.

Molecular sieves have the basic formula $M_{2/n}O.Al_2O_3.xSiO_2.yH_2O$ where M is a cation of n valence. The crystal structure of molecular sieves is a honeycomb type structure with relatively large cavities, each cavity combined with six adjacent cavities through apertures or pores. The water of hydration is contained within these cavities. The pore size of the molecular sieves depends on the grade of the sieve. The commonly used Type A molecular sieves contain roughly spherical cavities, approximately 11 angstroms in diameter and about 925 cubic angstroms in volume, that account for almost half the total crystalline volume available for absorption. The molecular sieves described in the present invention are classified based on a system used by UNION CARBIDE (for example 3A, 4A, 5A and 13X). However, any suitable sieve is within the scope of the present invention. In general, the elasticity and kinetic energy of incoming molecules allows passage of molecules up to 0.5 angstroms larger than the diameter of the aperture. For example, the aperture size in the sodium-bearing Type 4A is 3.5 angstroms in diameter. Therefore, molecules with a diameter as large as 4 angstroms are capable of passing into these molecular sieves.

The size and position of the exchangeable cation (Na, Ca, etc.) may affect the aperture size in any particular type of molecular sieve. For example, the replacement of sodium ions in Type 4A with calcium ions produces type 5A, with a free aperture size of 4.2 angstroms. Not wishing to be bound by theory, the cations are also probably responsible for the very strong and selective electronic forces which are unique to these adsorbents. In the case of molecular sieves, selectivity is influenced by the electronic effects of the cations in the cavity as well as the size of the apertures in the alumino-silica framework. Therefore, molecular sieves can be tailored to adsorb specific molecules by varying the size of the pores and the attractive forces.

In the present invention, any suitable molecular sieve can be used to trap the desired foaming agent. The appropriate molecular sieve is dependent on the size, electronegativity and polarizability of the foaming material desired to be trapped. Appropriate sieves for the present invention include, but are not limited to, Type 3A, 4A, 5A, 13X and combinations thereof (the A represents angstroms, and 13X has a pore size greater than 5A).

The Type A molecular sieve has a framework composed of truncated octahedral joined in a cubic array. This framework produces a central truncated cube octahedron with an internal cavity of 11 angstroms in diameter. Each central cavity, termed the alpha cage, is entered through six circular apertures formed by a nearly regular ring of eight oxygen atoms with a diameter of 4.2 angstroms. The cavities are thus arranged in a continuous three-dimensional pattern forming a system of unduloid-like channels with a maximum diameter of 11 angstroms and a minimum of 4.2 angstroms. The truncated octahedral themselves enclose a second set of smaller cavities 6.6 angstroms in internal diameter (beta cages) and connected to the larger cavities by means of a distorted ring of six oxygen atoms of 2.2 angstrom diameter.

Type 4A and Type 13X have the following unit cell formulas:

Type 4A: $Na_{12}[(AlO_2)_{12}(SiO_2)_{12}]\cdot 27H_2O$

Type 13X: $Na_{86}[(AlO_2)_{86}(SiO_2)_{106}]\cdot 276H_2O$.

In both cases the sodium cation can be exchanged with other cations to form other useful products. The product is usually supplied in a pellet or bead form which contains about 20 percent inert clay binder.

A wide variety of molecular sieves are available, each with its own specific and uniform pore size. This variety allows for the sieve to be chosen on the basis of the material to be adsorbed. Characteristics of type 3A, 4A, 5A and 13X molecular sieves are as follows: Type 3A is used to adsorb molecules with an effective diameter of less than 3 angstroms, including water and ammonia, and excludes molecules with a diameter of more than 3 angstroms, such as ethane; Type 4A is used to adsorb molecules with an effective diameter of less than 4 angstroms, including ethanol, hydrogen sulfide, carbon dioxide, sulfur dioxide, ethylene, ethane, and propene, and excludes molecules with an effective diameter greater than 4 angstroms, such as propene; Type 5A is used to adsorb molecules having an effective diameter of less than 5 angstroms, including n-butanol, n-butane, saturated hydrocarbons from methane to molecules containing twenty-two carbons, R-12, and excluding molecules having an effective diameter of greater than 5 angstroms, including iso-compounds and all four carbon ring compounds; 13X is used to adsorb molecules having an effective diameter less than 10 angstroms, and excludes molecules having an effective diameter greater than 10 angstroms (i.e., $(C_4F_9)3N$). Each type molecular sieve adsorbs molecules of the lower type, i.e., Type 5A will adsorb molecules adsorbed by Type 4A and so forth.

Adsorbents, such as solids, liquids or gases (preferably liquids and gases), are held by molecular sieves via strong physical and chemical forces, such as ionic forces, covalent forces and electrostatic attractions. Adsorbents can be desorbed by the application of heat, change in pressure or by displacement with another material, leaving the crystal structure of the molecular sieve in the same chemical state as when it entered. Adsorption and desorption are completely reversible with the respective isotherm curves coinciding completely. Isotherm curves can be used to regulate the adsorption and desorption of the foaming materials.

Molecular sieves possess a very high surface area; for example, the external surface area only comprises approximately one percent (1%) of the total surface area. The entire surface area of the molecular sieves is capable and available for adsorbing molecules. Therefore, the external surface area of the molecular sieves is available for adsorbing molecules of all sizes, whereas the internal surface area is available only to molecules small enough to enter the pores. However, because the external surface comprises approximately one percent (1%) of the total surface area, materials too large to be adsorbed within the pores will usually only be adsorbed by the external surface to the extent of 0.2 to 1 weight percent.

As mentioned, molecular sieves will not only separate molecules based on size and configuration, but they will also adsorb preferentially based on polarity or degree of chemical unsaturation. Therefore, molecules are held more tightly in the crystal structure if they are less volatile, more polar, or less chemically saturated. The strongest adsorptive forces are due primarily to cations acting as sites of strong, localized, positive charge that electrostatically attract the negative end of polar molecules. Polar molecules are molecules containing heteroatoms such as O, S, Cl, F, or N and are asymmetrical. Dipole moments can also be induced by cations present in the molecular sieves, resulting in the attraction of sites of unsaturation over saturated bonds. In view of these means of attraction, the molecular sieves adsorb not only on the basis of molecular size, but additionally on the basis of electronic forces. For example, molecular sieves will adsorb carbon monoxide (CO) in preference to argon (Ar) and olefins (C=C) in preference to saturated hydrocarbons (C—C).

Although molecular sieves possess the ability to adsorb and desorb, they have predominately been employed simply for their adsorptive ability, while their desorptive ability has been used simply to reactivate the molecular sieves for reuse. The ability of molecular sieves to adsorb a single molecule and even a single type of molecule has been obtained for many adsorbents. Therefore, a correlation is easily made between the desired foaming material to be used in the foaming process and the corresponding molecular sieve capable of carrying the foaming material.

Any suitable foaming material that can be adsorbed by molecular traps can be used to foam the desired resin. Suitable foaming materials include but are not limited to inert gases, saturated aliphatic hydrocarbons, saturated alicyclic hydrocarbons, aromatic hydrocarbons, halogenated hydrocarbons, and ethers, ketones, and alcohols from one to eight carbons in length. Examples of these foaming materials include carbon dioxide, nitrogen, methane, ethane, propane, butane, pentane, hexane, methylpentane, dimethylbutane, methylcyclopropane, cyclopentane, cyclohexane, methylcyclopentane, ethylcyclobutane, isopropyl alcohol, propyl alcohol, ethanol, butanol, isobutanol, sec-butanol, heptanol, pentanol, isopentanol, hexanol, 1,1,2-trimethylcyclopropane, dichlorodifluoromethane, monochlorodifluoromethane, trichlorotrifuoroethane, sulfur hexafluoride, dichlorotetrafluoroethane, dichlorotrifluoroethane, monochlorodifluoroethane, tetrafluoroethane, dimethyl ether, 2-ethoxy-acetone, methyl ethyl ketone, acetyl acetone, dichlorotetrafluorethane, monochlorotetrafluoroethane, dichloromonofluoroethane and difluoroethane. Although not all of the above mentioned foaming materials can be adsorbed by the molecular sieves in the preferred embodiment of the present invention, these materials can be adsorbed and subsequently desorbed by other molecular traps within the scope of the present invention. Generally, straight chain and branched hydrocarbons, alcohols, ketones, ethers, esters, carboxylic acids, organohalides and aldehydes comprising from one to eight carbons can be used as appropriate foaming materials for molecular sieves.

In addition to foaming materials, other materials may be adsorbed within the molecular sieves to affect other properties in the foaming process. For example, isopropyl alcohol can be adsorbed within a molecular sieve and introduced into a resin to catalyze crosslinking of the polymers in the foaming process, thereby strengthening the final product. Also, fire retardent compositions such as butyl bromine can be adsorbed within the molecular sieves to make the foamed product fire retardant. When the foamed material is solidified, the fire retardent composition will be adsorbed within the molecular sieves. The fire retardent compound will remain in the sieve until its temperature is raised to a predetermined temperature, such as during a fire, causing the evolving of the gas and the extinguishing of the fire. Fire retardent compositions commonly used in foaming processes can be used with the present blowing agent composition.

When desired, other additives can be combined with the blowing agent to customize or tailor the properties of the foamed product. Examples of useful additives include but are not limited to plasticizers, lubricants, fillers, extends, pigments, stabilizers and antioxidants.

In addition, additives such as gelatin, powders and viscous liquids can be added to the blowing agent composition. For example, oil may be added to the blowing agent composition to form a suspension, minimizing dusting, combustion and explosive characteristics, and to provide easier handling. The blowing agent can be mixed with the oil by any means of mixing commonly employed in the art, including but not limited to mechanical mixing or mixing using an ultrasonic means. The blowing agent may additionally be formed into pellets, pastes, waxes, or gels to ease introduction into the extruding device.

The blowing agent composition comprising a foaming material adsorbed within a molecular sieve is a solid structure which is easily handled. Although it is preferred that the blowing agent composition be stored in a sealed container to prevent unwanted molecules from replacing the foaming material, the sieve can nevertheless be handled easily when combined with resins and formed into pellets, pastes, waxes, or gels. In other words, the blowing agent can be added to the extruder in the same manner as the resin, and if desired, with the resin. Furthermore, molecular sieves containing different foaming materials can be added together with a resin to provide the addition of these different foaming materials into a single foaming process. This feature allows for a high degree of flexibility in optimizing the characteristics desired in the foamed product. Heretofore, it has not been economically possible to add a wide variety of foaming materials to the resin in the foaming process. However, using the blowing agent composition in the present invention, the foaming agents added can be adapted to optimize the rheology, resulting in an increase in the temperature decomposition range.

In addition, the foaming material can be added to the molecular trap at any time. For example, molecular traps alone (not containing a foaming material) can be blended with a desired resin in a standard extrusion process. However, because no foaming material is present in the molecular trap, the resin is not foamed. The resultant material is resin having molecular traps dispersed therein, preferably in pellet form. The resin/molecular trap blend is subsequently exposed to a foaming material so that the foaming material can be adsorbed by the molecular traps. The resin/molecular trap mixture is preferably solidified prior to exposing the mixture to the foaming material. Once the foaming material is adsorbed by the traps forming a resin having a blowing agent composition (foaming material adsorbed by molecular traps), the resin/blowing agent composition can be foamed or extruder in the same manner as disclosed for other embodiments of the present invention.

Accordingly, a further embodiment of the present invention is a method for preparing a composition for use as a blowing agent, comprising exposing a molecular sieve to a foaming material so that the molecular sieve will "trap" the foaming material. The foaming material to be trapped must be added to the molecular sieves at a rate sufficient to allow adsorption, but slow enough so that the pressure within the vessel containing the sieves remains relatively constant. The rate at which the gas is added to the molecular sieves in the method for preparing the blowing agent is dependent primarily on four variables:

(a) the rate at which the material being adsorbed can diffuse to the activated crystals within the pellets. This process is facilitated by maximizing exposure of the molecular sieves to the foaming material. The exposure of the molecular sieves to the foaming material is accomplished by agitating the vessel in which the sieves are contained. Alternatively, when the foaming material is a gas, the exposure of the sieves to the gas can be optimized by causing the sieves to travel in a direction counter to the direction of the gas. The gas is preferably introduced into the vessel containing the molecular sieves using a gas lance, while an auger is used to facilitate the movement of the molecular sieves in a direction opposite the gas to maximize the exposure of the sieves to the gas;

(b) the relative size of molecules and the molecular sieve pores;

(c) the strength of the adsorptive forces between the molecular sieves and the absorbate or the gas to be adsorbed; and (d) the temperature.

The blowing agent is produced when the desired foaming gas is adsorbed within the appropriate molecular sieve. Once produced, the blowing agent is preferably stored in a sealed container so that unwanted materials are not adsorbed by the molecular sieves.

The foamed product formed using the blowing agent of the present invention may be rendered flame retardent by adding suitable flame retardent agents, such as brominated compounds or phosphate compounds known in the art. These flame retardent agents may be adsorbed by the molecular sieves or added to the blowing-agent resin mixture.

A further embodiment of the present invention is a foamable blowing agent-resin mixture comprising a blowing agent and a resin to be foamed. Here again, the blowing agent is composed of a molecular sieve and a foaming material in an amount up to approximately 26% by weight of the blowing agent composition. The blowing agent is mixed with a resin to form the foamable blowing agent-resin mixture. Mixing the blowing agent with the resin so that the blowing agent is uniformly mixed within the resin aids in the consistency of the foamed product. The blowing agent-resin mixture may be mixed by any suitable method, including mechanical or ultrasonic means. The blowing agent-resin mixture is subsequently added to an extruder, cavity mold or similar device for foaming.

When the foaming material is not present in the molecular trap, the same procedure is followed with the molecular trap being mixed with the resin and added to an extruder. However, because no foaming material is present in the trap, foaming does not occur; the product is a resinous material containing the molecular trap dispersed therein. A foaming material, such as a foaming gas ($CO_2$), can then be added to the resin/molecular trap blend to provide a foaming material to the molecular trap. The resin containing the molecular trap/foaming material (equivalent to the blowing agent composition) can then be foamed exactly like the other embodiments of the present invention, such as by extrusion, to form a foamed product.

The mixture of the blowing agent and the resin may vary widely, depending on the characteristics of the foamed product desired. However, the blowing composition is generally used in an amount of about 0.05% to about 50% by weight, preferably about 0.25% to about 21% by weight, and most preferably in an amount 0.5% to about 7% by weight, based on the weight of the total resin employed. The blowing agent-resin mixture used is dependent upon the bubble properties desired in the resin product. For example, the blowing agent is preferably used in an amount between about 0.5% to about 3% for high density foamed products;

between about 3% to about 15% for low to medium density foamed products; and between about 5% to about 50% for ultra low density foamed products. The temperature at which foaming occurs is dependent upon the blowing agent and the resin used, as well as the product desired.

Different blowing agents may also be added to the resin to obtain desired foamed product characteristics. In addition, differing proportions of blowing agents can be combined to optimize the foam characteristics, such as flexibility, rigidity, strength and durability of the foamed product. Furthermore, by varying the rheology of the resin mixture, the temperature window for foaming certain resins can be broadened, resulting in the foaming of certain resins that have heretofore been difficult if not impossible to foam. In addition, varying the blowing agent can affect such properties as the melt strength of the polymer to form sturdier products. Until the present time, variance of blowing agent compositions has been economically impractical due to the necessity of gas injection systems to introduce the foaming gases into the resin.

Resins employed in the present invention with the blowing agent include but are not limited to natural and synthetic resins, acrylonitrilebutadiene rubbers, viscous setable ceramic materials and blends thereof, polyolefins (for example, low and high density polyethylene and polypropylene), olefin copolymers (for example, copolymers of ethylene and ethylvinylacetate), polyaromatic olefins, styrenic compounds and polymerized halo-diolefins (for example, neoprene, ethylene-propylene copolymers, polyvinyl chloride, polycarbonate, polyesters, poly-alpha methylstyrene and polystyrene).

Still a further embodiment of the present invention is the use of the blowing agent in the foaming process. As mentioned earlier, an advantage of the blowing agent comprising a molecular sieve and a foaming material is that the foaming material (usually a gas) is introduced into the resin prior to extrusion, thus eliminating the need for a gas injector. In addition, the molecular sieve being uniform in size functions as a nucleation site, thus eliminating the need to add a nucleating agent such as talc. Furthermore, gas bubbles combining in the foaming process to form non-uniform pockets of bubbles is decreased when molecular sieves are used to carry the foaming material, because the foaming gas is produced at the site of nucleation, the molecular sieve. The sieves being both uniform in size and the site of gas formation results in uniform bubbles being formed in the foamed product.

Foamed products are prepared with the blowing agent of the present invention by any of the known methods in the art. For example, the blowing agent is mixed with a suitable resin and extruded or molded by a suitable method, such as pressure molding, die molding, paste molding, calendar molding, extrusion molding or injection molding. Molding means forming an article by deforming the blowing agent-resin mixture in the heated molten state. The foamable blowing agent-resin mixture is added to the extruder through a hopper, where the mixture is thoroughly blended and exposed to heat to expand the resin and form a foamed resin product. Here again, the characteristics of the foamed product can be varied depending on the foaming conditions and the specific compositions used in the process.

The blowing agent-resin mixture can be used to create foam in single screw extrusion, multi-screw extrusion or tandem screw extrusion processes. Because of the nature of the molecular sieve structure, the blowing agent mixes more thoroughly with the resin to form a homogenous mixture than other gaseous foaming agents added via a gas injection system. Uniform mixing results in a consistent product with a uniform cellular structure.

During the foaming process, the blowing agent-resin is preferably exposed to temperatures and pressures that have been preselected for the specific resin and blowing agent employed and product characteristics desired. Preferably, the foamable blowing agent-resin composition is exposed to high temperatures and pressures characterized as supercritical conditions. Supercritical conditions are conditions at which the gas is in a "fourth" state of matter, being neither a gas, liquid or a solid, but a fourth state which exhibits unique qualities. Once the gas is exposed to supercritical conditions, gas passes to a low pressure zone in the extruder so that the foaming material adsorbed within the molecular sieves is released, resulting in the foaming of the resin. Upon cooling, the desired foamed resin product is solidified, producing a uniform cellular structure. Any suitable method of foaming, injection molding or extruding known in the art may be used with the present blowing agent to form foamed resins.

The foamed composition produced by the above mentioned process comprises a blowing agent containing a molecular sieve and a foaming material, and a foamed resin which has undergone foaming to form a solid cellular structure. In addition, the molecular sieves, foaming materials, resins and additives in the foamed composition are analogous to those mentioned above.

The above procedure and composition may be varied; however, it is essential that the molecular sieves and the foaming gas are present in the blowing agent.

The present invention is further a method and composition for encapsulating a blowing agent, i.e., a molecular trap having a foaming material contained therein, on a resinous substrate. The present invention also includes a method for foaming a resin using the encapsulated blowing agent.

The method of encapsulation comprises coating resinous beads or pellets with a solvent solution of a tacky resin. The resinous substrate should be the same resin which is to be foamed. The tacky resin is preferably poly ethylene vinyl acetate, poly vinyl pyrrolidone, a polyacrylic acid or a polyacrylic acid derivative. The solvent may be butane, pentane toluene or other known solvent. Between approximately 0.1% and 50% by weight of the tacky resin is added to the appropriate solvent to form a solution. Thereafter, the polymer beads are coated with the solvent solution. A quantity of a molecular trap is then applied to the solvent and tacky resin solution. The molecular trap is added to the solvent and tacky resin solution in an amount between 10% and 60% by weight of the encapsulated compound and can be applied to the solvent and tacky resin solution by any method commonly employed in the art including, but not limited to, tumbling or spraying. The molecular trap utilized may be any molecular trap detailed above, and is preferably in powder form. Once applied, the molecular trap will absorb the solvent to form a blowing agent. Thereafter, a sealing compound is applied to the pellet formed in the foregoing process in a film no greater than approximately 1.0 mm. The purpose of the sealing compound is to prevent the intrusion of moisture into the blowing agent. Compounds suitable for the sealing compound include, but are not limited to, sorbitol derivatives, and monoglycerides and can be applied by any method commonly used in the art.

The tacky resin should have a melting temperature near the melting temperature of the resin to be foamed but not more than 50° to 100° F. lower than the melting temperature of the resin to be foamed. The encapsulation of the blowing agent on the resinous substrate is accomplished at room temperature and pressure. Preferably, the resinous substrate is 50% by weight of the encapsulated compound.

The encapsulated compound is then mixed with the resin to be formed in an amount between approximately 1% and 5% by weight of the resin to be foamed. The exact amount of encapsulated compound added depends upon the final product desired and therefore will require a modest amount of experimentation commonly undertaken by those with ordinary skill in the art. This mixture is then fed to the extruder's entrance. Any resin can be foamed using the encapsulated compound. Thereafter, the resin is foamed in accordance with normal industry procedure.

In an alternative embodiment, approximately 2% by weight of the resin to be foamed is coated in accordance with the method detailed above and reintroduced to the resin batch. Thereafter, the batch is extruded to form a foamed resin.

Still yet another embodiment of the present invention is a method for foaming a moisture-sensitive resin. The present invention may further be characterized as a foamed moisture-sensitive resin composition. The moisture-sensitive polymers include, but are not limited to, nylon, polycarbonates, acetals, poly-formaldehydes, and polyesters, including polyethylene terephthalate (PET). The method comprises mixing the moisture-sensitive resin with a blowing agent compound and subsequently extruding the mixture.

With respect to foaming PET, it is important to recognize that the compound may be either crystalline (CPET) or amorphous (APET). The choice of CPET or APET depends upon the end use of the foamed composition. For example, if the composition is to be used as a material for flotation devices or microwavable containers, CPET is preferred, while if the end composition is to be used as building insulation or bottles, APET is preferred. The choice of APET or CPET is within the purview of an artisan with ordinary skill in the art.

The blowing agent compound comprises a first molecular trap and a second, larger pore size molecular trap with a foaming material contained therein. Preferably the first molecular trap is a 3A molecular sieve. The second molecular trap has a pore size greater than 3A. The function of the first molecular trap is to act as a desiccant, removing water molecules from the resin as well as any water contained in the second molecular trap. The removal of these water molecules from the resin reduces the occurrence of chemical bond cleavage within the polymer, which in turn increases the strength of the foamed product. The foaming material is carded exclusively by the second molecular trap and is present in approximately between 10% and 30% by weight of the second molecular trap. Foaming materials which can be used with the present method include pentane, isobutane, or any other solvent commonly used in the art. Although all of molecular traps are nucleating sites, the remaining 70%–90% by weight of the second molecular trap function exclusively as nucleation sites. Preferably, the first molecular trap of the blowing agent is added to the moisture-sensitive resin in an amount between approximately 0.6% and 1.0% by weight, while the second molecular trap is present in an amount between approximately 2.0% and 4.0% by weight.

To this mixture is added a poly-hydroxy ester, preferably a liquid sorbitol ester. The poly-hydroxy ester serves two functions. First, it "heals" breaks in the polymer chain; that is, it provides a molecular bridge between two separated polymer chain sections. Second, the poly-hydroxy ester minimizes dusting of the mixture. Preferably, the poly-hydroxy ester is added to the mixture in an amount between approximately 1% and 5% by weight. Optionally, in order to increase handling characteristics, between 1% and 2% by weight of a micro crystalline wax may be added to the mixture. The mixture is then pelletized in accordance with normal industry procedure. The exact amount of the first and second molecular trap and the poly-hydroxy ester will vary slightly depending upon the desired characteristics of the final product, and thus, will require a modest amount of experimentation by those with ordinary skill in the art.

The pelletized mixture is then fed into an extruder. Alternatively, the pelletized mixture may be transported in a solution of a foaming material which is a liquid at room temperature. The external foaming material acts as a carrier as well as an additional source for the creation of bubbles. The extruder used can be any commonly used in the industry capable of attaining the temperature and pressure required to form the particular foamed moisture-sensitive resin. For example, the range of temperature required to form the foamed PET is as follows: 485° F. to 500° F. within the extruder and an extruder exit temperature of between 465° F. and 490° F. The pressure within the extruder is preferably between approximately 1300 and 3000 psi. The specific temperature and pressure is a function of the type of moisture-sensitive resin being foamed and the extruder design, and will therefore require a modest amount of experimentation commonly undertaken by those with ordinary skill in the art.

Alternatively, moisture-sensitive resins may be foamed by encapsulating a blowing agent compound onto a resinous substrate and thereafter mixing the encapsulated blowing agent compound with the resin to be foamed and extruding the resin and encapsulated blowing agent as detailed above. The method first involves coating resinous beads or pellets with a blowing agent compound. The blowing agent compound is comprised of between approximately 13% to 16% by weight of a first molecular trap, approximately 43% to 56% by weight of a second molecular trap impregnated with a foaming material, and approximately 22% to 28% by weight of a poly-hydroxy ester. Optionally, a quantity of a tacky resin, as defined above, may be added to the poly-hydroxy ester to increase the adhesion of the blowing agent compound to the resinous substrate. Optionally, between 0% and 22% by weight of a micro-crystalline wax may be added. The foaming material contained within the second molecular trap includes pentane, isobutane, or any other solvent commonly used in the art. The foaming material is present in an amount between approximately 10% and 30% by weight of the second molecular trap.

Preferably the first molecular trap is a 3A molecular sieve. The second molecular trap has a pore size greater than 3A. The function of the first molecular trap is to act as a desiccant, removing water molecules from the resin as well as any water contained in the second molecular trap. The removal of these water molecules from the resin reduces the occurrence of chemical bond cleavage within the polymer, which in turn increases the strength of the foamed product. Preferably, the poly-hydroxy ester is liquid sorbitol ester. The poly-hydroxy ester provides the necessary adhesion to enable the blowing agent compound to effectively coat the resinous substrate. Also, as detailed above, the poly-hydroxy ester provides a molecular bridge between divided polymer chain sections within the resin.

The resinous substrate may be coated with the blowing agent compound by any method commonly encountered in the art. After the resinous substrate has been coated with the blowing agent compound, a sealing compound is applied to the pellet formed in the foregoing process in a film no greater than approximately 1.0 min. The purpose of the sealing compound is to prevent the intrusion of moisture into the first and second molecular traps. Compounds suitable for the sealing compound include, but are not limited to, sorbitol derivatives and monoglycerides and can be applied by any method commonly used in the art. Preferably, the resinous substrate is 50% by weight of the encapsulated blowing agent compound.

The encapsulated blowing agent composition is then mixed with the resin to be foamed in an amount between approximately 1% to 5% by weight of the resin to be foamed. Thereafter, the mixture is fed to an extruder and extruded in the manner detailed above.

The method described above yields a foamed moisture-sensitive polymer having between approximately 10% to 90% density reduction, depending on the end use of the product.

It will be clear to those skilled in the art of blowing agents or extrusion of foamable materials that many modifications and substitutions can be made to the blowing agent and its various methods of use described above without departing from the spirit and scope of the invention, which is defined by the appended claims.

What is claimed is:

1. A method for preparing a foamed resin composition, said method comprising the steps of:

mixing a blowing agent compound with a resin to form a first mixture, said blowing agent compound comprising a first molecular trap, a second molecular trap and a foaming material, said foaming material being carried by a preselected quantity of said second molecular trap, wherein said first molecular trap is a type 3A molecular trap and wherein said second molecular trap has a pore size greater than 3A, said first mixture having a temperature and a pressure; and changing said temperature and said pressure of said first mixture until said temperature and said pressure are within a preselected range so that said foaming material evolves from said second molecular trap into said polymer to form said composition.

2. The method as recited in claim 1, wherein said preselected quanity is between approximately 10% and 30% by weight of said second molecular trap.

3. The method as recited in claim 1, wherein said first molecular trap is present in an amount between aproximately 0.6% and 1% by weight of said composition, and wherein said second molecular trap is present in an amount between approximately 2.0% and 4.0% by weight of said composition.

4. The method as recited in claim 1, wherein said mixing step further comprises the step of adding a poly-hydroxy ester to said first mixture, said poly-hydroxy ester added in an amount between approximately 1% and 5% by weight of said composition.

5. The method as recited in claim 1, wherein said mixing step further comprises the step of adding sorbitol ester, said sorbitol ester added in amount between approximately 1% and 5% by weight of said composition.

6. The method as recited in claim 1, wherein mixing step further comprises the step of adding a micro crystalline wax, said wax added in an amount between approximately 1% and 2% by weight of said composition.

7. The method as recited in claim 1, wherein said resin is selected from the group consisting of nylon, polycarbonates, acetals, poly-formaldehydes, and polyesters.

8. The method as recited in claim 1, wherein said resin is polyethylene terephthalate.

\* \* \* \* \*